3,819,709
SYNTHESIS OF N-METHYLANILINE

Koichi Murai, Kyoto-fu, Giichi Akazome, Kyoto, Tatsuo Kyuma, Uji and Mikio Nakazawa, Kyoto, Japan, assignors to New Japan Chemical Company Limited, Fushimi-ku, Kyoto-shi, Japan
No Drawing. Filed Dec. 9, 1970, Ser. No. 96,638
Int. Cl. C07c 87/62
U.S. Cl. 260—577   5 Claims

ABSTRACT OF THE DISCLOSURE

A method of manufacturing N-methylaniline by reacting aniline with methanol. The reaction is conducted in the presence of a catalyst selected from the group consisting of (a) copper and (b) a chromium catalyst having the formula $$Cr \cdot Me^1 \cdot Me^2 \cdot O$$

wherein $Me^1$ is Cu, Zn, Fe, or Ni and $Me^2$ is Ba, Ca, Mg or Mn, Cr being contained in the range of 20 to 80 weight percent, $Me^1$ being contained in the range of 20 to 80 weight percent and $Me^2$ being contained in the range of 0 to 5 weight percent, based on the total weight of said metals respectively.

---

This invention relates to the manufacture of N-methylaniline, and more particularly to an improved method for manufacturing N-methylaniline from aniline and methanol.

N-methylaniline is a useful compound and has been used in various fields, for example, as a starting material for producing dyes, medicines, additives for rubber, etc. and as an antioxidant to be added to various organic compounds.

It is known in the art to produce N-methylaniline by reacting aniline with methanol in the presence of an acid catalyst, such as sulfuric acid, hydrochloric acid, etc. According to such conventional method, however, a considerable amount of undesired N,N-dimethylaniline is produced as a byproduct, reducing the yield of the desired N-methylaniline. Moreover, the boiling point of the N,N-dimethylaniline produced is so close to that of the desired N-methylaniline that the latter cannot be separated from the former by distillation, and therefore it is strictly required to separate them after the acetylation of the N-methylaniline produced and to regenerate the acetylated N-methylaniline. Therefore complicated procedures are necessary.

It is also known in the art to produce N-methylaniline by reacting monochlorobenzene and methylamine in the presence of a cupric salt, but this method cannot be practiced on commercial scale because it is required not only to use a special apparatus resistant to the corrosive action of the hydrogen chloride produced as a byproduct but also to employ as a starting material expensive monochlorobenzene which renders the process uneconomical.

An object of the invention is accordingly to provide an improved method for producing N-methylaniline in a high yield from commercially available starting materials, aniline and methanol.

Another object of the invention is to provide a method for producing N-methylaniline selectively free of the production of the undesired N,N-dimethylaniline.

These and other objects and advantages of the invention will be apparent from the following description.

In manufacturing N-methylaniline by reacting aniline with methanol, the present method is characterized in that the reaction is conducted in the presence of a catalyst selected from the group consisting of (a) copper and (b) a chromium catalyst represented by the formula of $$Cr \cdot Me^1 \cdot Me^2 \cdot O \qquad (I)$$

wherein $Me^1$ is Cu, Zn, Fe, or Ni and $Me^2$ is Ba, Ca, Mg or Mn, Cr being contained in the range of 20 to 80 weight percent, $Me^1$ being contained in the range of 20 to 80 weight percent and $Me^2$ being contained in the range of 0 to 5 weight percent, based on the total weight of said metals respectively.

According to the researches of the present inventors it has been found that the reaction of aniline with methanol to produce N-methylaniline is markedly accelerated by the use of the above specific catalyst with the result that N-methylaniline can be obtained selectively in a high yield free of the production of undesired N,N-dimethylaniline. In fact N-methylaniline can be produced selectively substantially free of the production of the undesired N,N-dimethylaniline in accordance with the present method, so that by distillation of the resultant reaction mixture, pure N-methylaniline can be obtained in a high yield of more than 95 mole percent.

The catalysts used in the invention includes (a) copper and (b) chromium catalyst shown in the formula (I) before. These catalysts are known in the art as hydrogenation catalysts and dehydrogenation catalysts, but no report has been made yet as to whether such catalysts are effective for the present reaction. The copper catalyst includes metal copper and Raney copper. Typical examples of the chromium catalysts of the formula (I) are $Cr \cdot Cu \cdot O$, $Cr \cdot Zn \cdot O$, $Cr \cdot Ni \cdot O$, $Cr \cdot Fe \cdot O$, $Cr \cdot Mo \cdot O$, $Cr \cdot Cu \cdot Ba \cdot O$, $Cr \cdot Cu \cdot Mn \cdot O$, etc. Of these catalysts those catalysts are preferred in which $Me^1$ in the formula (I) is Cu, i.e. the catalysts shown in the formula of $$Cr \cdot Cu \cdot Me^2 \cdot O$$

wherein the definition of $Me^2$ and the amount of the metals contained are the same as in formula (I). More preferable catalysts are those shown in the formula of $Cr \cdot Cu \cdot O$, $Cr \cdot Cu \cdot Mn \cdot O$ and $Cr \cdot Cu \cdot Ba \cdot O$, in which Cr is contained in the range of 40 to 50 weight percent, Cu is contained in the range of 50 to 60 weight percent and Mn or Ba is contained in the range of 1 to 4 weight percent, based on the weight of the metals contained therein. The catalyst shown in the formula $Cr \cdot Cu \cdot O$ above is the most preferable in the present invention. The catalyst may be used in a wide range of amount, but usually in an amount of 1 to 10 weight percent, preferably 3 to 6 weight percent, based on the weight of the starting aniline used.

According to one of the preferred procedures for practicing the present method, aniline, methanol and catalyst are placed in a pressure-reactor, such as an autoclave, and the air in the autoclave is replaced with nitrogen or like inert gas or hydrogen gas. The methanol may be used in stoichiometric or excess amount, usually in the range of 1 to 10 moles, preferably 2 to 6 moles, per mole of the starting aniline. The mixture in the autoclave is then heated with stirring at a temperature of 150 to 300° C., preferably 200 to 250° C., to effect reaction in the liquid phase between aniline and methanol to produce N-methylaniline. The reaction is preferably carried out in a closed vessel, such as an autoclave, so that the reaction pressure is usually saturated pressure of the methanol used at the reaction temperature applied, and is usually in the range of 30 to 200 atmospheric pressures, preferably 50 to 150 atmospheres. This reaction may be conducted not only by a batch method but also in a continuous manner.

After the reaction, the resultant liquid reaction mixture is filtered to separate the catalyst used and then distilled under a reduced pressure to obtain N-methylaniline. The N-methylaniline thus obtained has a high degree of purity and contains substantially no N,N-dimethylaniline.

For a better understanding of the invention examples are given below.

EXAMPLE 1

150 g. of $Cu(NO_3)_2 \cdot 3H_2O$ was dissolved in 900 ml. of water and the resultant solution was added dropwise with stirring to 900 ml. of aqueous solution containing 255 ml. of 28 weight percent ammonia water and 120 g. of $Na_2Cr_2O_7$. The precipitate thus produced was separated by filtration, washed with 200 ml. of water, dried at 75 to 80° C. for 12 hours and then pulverized into grains. The grains thus obtained were placed on an evaporating dish and heated at 350 to 400° C. in a sand bath until the generation of gas ceased. The resultant product was added to 600 ml. of 10-weight percent acetic acid and stirred for 30 minutes. The precipitate thus produced was separated by filtration, washed with water and dried at 125° C. for 12 hours, whereby was obtained Cr·Cu·O catalyst in which Cr is contained in 47 weight percent and Cu is contained in 53 weight percent, based on the total weight of the Cr and Cu.

In a 500 ml. autoclave equipped with a stirrer were placed 93 g. (1.0 mole) of aniline, 96 g. (3.0 mole) of methanol and 5.0 g. of Cr·Cu·O catalyst obtained as above. The air in the autoclave was replaced with nitrogen gas and the mixture was heated with stirring at 500 r.p.m. at 230° C. for 160 minutes to effect liquid phase reaction between aniline and methanol. After the reaction the resultant liquid reaction mixture was filtered to remove the catalyst used and further removal of low-boiling substances by distillation gave 106 g. of crude reaction product. Analysis thereof gave the following results:

|  | Mole percent |
|---|---|
| Conversion of aniline | 97.7 |
| Yield of N-methylaniline to converted aniline | 98.5 |
| Selectivity | 99.0 |

The crude product was distilled under a reduced pressure of 80 mm. Hg, whereby 98 grams of N-methylaniline having a purity of 98.8 wt. percent was obtained.

The catalyst used in this Example was reused and the reaction between aniline and methanol was carried out in the same manner as in Example 1 with the following results.

|  | Mole percent |
|---|---|
| Conversion of aniline | 97.6 |
| Yield of N-methylaniline | 98.0 |
| Selectivity | 97.6 |

EXAMPLE 2

In the same autoclave as in Example 1 were placed 93 g. of aniline, 64 g. of methanol and 5 g. of catalyst the same as in Example 1. After the air in the autoclave was replaced with nitrogen gas, the mixture was heated with stirring at 700 r.p.m. at 250° C. for 150 minutes. The resultant liquid reaction mixture was treated in the same manner as in Example 1, whereby 106 g. of crude reaction product was obtained. The analysis thereof gave the following results:

|  | Mole percent |
|---|---|
| Conversion of aniline | 98.1 |
| Yield of aniline | 98.4 |
| Selectivity | 98.9 |

EXAMPLE 3

In a 500 ml. autoclave equipped with a stirrer were placed 93 g. (1.0 mole) of aniline, 64 g. (2.0 mole) of methanol and 5.0 g. of Cr·Cu·Mn·O catalyst in which Cr is contained in 43 wt. percent, Cu is contained in 53 wt. percent and Mn is in 4 wt. percent, based on the total weight of the Cr, Cu and Mn. The air in the autoclave was replaced with nitrogen gas and the mixture was heated with stirring at 700 r.p.m. at 250° C. for 200 minutes to effect liquid phase reaction between aniline and methanol. After the reaction the resultant liquid reaction mixture was filtered to remove the catalysts and further removal of low-boiling substances by distillation gave 105 g. of crude reaction product. Analysis thereof gave the following results.

|  | Mole percent |
|---|---|
| Conversion of aniline | 98.0 |
| Yield of N-methylaniline to converted aniline | 97.7 |
| Selectivity | 98.1 |

The crude product was distilled under a reduced pressure of 80 mm. Hg, whereby 99 grams of N-methylaniline having a purity of 97.0 wt. percent was obtained.

EXAMPLE 4

Aniline and methanol were reacted to produce N-methylaniline in the same manner as in Example 1, except that catalysts shown in Table 1 were used and that the reaction was conducted for the period shown in Table 1 below.

TABLE 1

| | Experiment No. | | | |
|---|---|---|---|---|
| Catalyst used | 4-1 | 4-2 | 4-3 | Comparison |
| | Raney copper | Cr·Zn·O [1] | Cr·Cu·Ba [2] | Raney nickel |
| Reaction period (min.) | 300 | 200 | 200 | 480 |
| Conversion of aniline (mole percent) | 94.0 | 97.5 | 90.8 | 78.6 |
| Yield of N-methylaniline (mole percent) | 96.3 | 95.8 | 96.0 | 86.6 |
| Selectivity (mole percent) | 98.5 | 96.8 | 97.4 | 88.2 |
| Purity [3] (wt. percent) | 98.2 | 98.6 | 98.0 | 80.3 |

[1] Cr·Zn·O catalyst used containing 30 wt. percent of Cr and 70 wt. percent of Zn based on the total weight of the Cr and Zn.
[2] Cr·Cu·Ba·O catalyst used containing 45.6 wt. percent of Cr, 52.6 wt. percent of Cu and 1.8 wt. percent of Ba, based on the total weight of the metals.
[3] Purity shows that of N-methylaniline obtained by distillation under 80 mm. Hg.

What we claim is:

1. A method of producing N-methylaniline comprising reacting aniline and methanol in liquid phase in the presence of a catalyst at a temperature of 150° C. to 300° C. under a saturated pressure of methanol between 30 and 200 atmospheres, said catalyst being selected from the group consisting of: (a) copper and; (b) a chromium catalyst selected from the group consisting of Cr.Cu.O, Cr.Zn.O, Cr.Ni.O, Cr.Fe.O, Cr.Mo.O, Cr.Cu.BaO and Cr.Cu.MnO, said Cr being present in said catalyst in the range of 20 to 80 weight percent, said Cu, Zn, Ni, Fe or Mo being present in said catalyst in the range of 20 to 80 weight percent, and said Ba or Mn being present in said catalyst in the range of 1 to 4 weight percent.

2. The method according to Claim 1, in which said catalyst is one species selected from the group consisting of Cr·Cu·O, Cr·Cu·Mn·O and Cr·Cu·Ba·O, in which Cr is contained in the range of 40 to 50 weight percent, Cu is contained in the range of 50 to 60 weight percent and Mn or Ba is contained in the range of 1 to 4 weight percent, based on the total weight of the metals contained therein.

3. The method according to Claim 2, in which said catalyst is Cr·Cu·O.

4. The method according to Claim 1, in which said reaction temperature is within the range of 200 to 250° C.

5. A method according to Claim 1 wherein said catalyst is present in an amount of 1 to 10 weight percent of the weight of the aniline.

(References on following page)

References Cited

UNITED STATES PATENTS

| | | | |
|---|---|---|---|
| 2,580,284 | 12/1951 | Deahl et al. | 260—577 |
| 3,397,237 | 8/1968 | Jackson | 260—577 X |
| 3,223,734 | 12/1965 | Fallstad et al. | 260—570.9 X |
| 2,323,948 | 7/1943 | Von Bramer et al. | 260—577 |

OTHER REFERENCES

Wagner and Zook: *Synthetic Organic Chemistry*, John Wiley & Sons, Inc., New York, 1953, pp. 667–668.

LORRAINE H. WEINBERGER, Primary Examiner

C. F. WARREN, Assistant Examiner

UNITED STATES PATENT OFFICE
CERTIFICATE OF CORRECTION

Patent No. 3,819,709  Dated June 25, 1974

Inventor(s) Koichi Murai, Giichi Akazome, Tatsuo Kyuma and
Mikio Nakazawa

It is certified that error appears in the above-identified patent and that said Letters Patent are hereby corrected as shown below:

In the heading insert --

Claims priority of Japanese Patent Application No. 101166 of 1969, filed December 15, 1969.

Signed and sealed this 15th day of April 1975.

(SEAL)
Attest:

RUTH C. MASON
Attesting Officer

C. MARSHALL DANN
Commissioner of Patents
and Trademarks